United States Patent
Mizuyabu et al.

(10) Patent No.: US 7,114,086 B2
(45) Date of Patent: Sep. 26, 2006

(54) SYSTEM FOR REDUCED POWER CONSUMPTION BY MONITORING INSTRUCTION BUFFER AND METHOD THEREOF

(75) Inventors: Carl Mizuyabu, Thornhill (CA); Mark Sternberg, Toronto (CA); Milivoje Aleksic, Richmond Hill (CA)

(73) Assignee: ATI Technologies, Inc., Toronto (CA)

( * ) Notice: Subject to any disclaimer, the term of this patent is extended or adjusted under 35 U.S.C. 154(b) by 646 days.

(21) Appl. No.: 10/083,875

(22) Filed: Feb. 27, 2002

(65) Prior Publication Data

US 2003/0131269 A1 Jul. 10, 2003

Related U.S. Application Data

(60) Provisional application No. 60/345,100, filed on Jan. 4, 2002.

(51) Int. Cl.
*G06F 1/32* (2006.01)

(52) U.S. Cl. ............ 713/320; 713/300; 713/322; 713/323; 712/200; 712/220; 712/225; 712/229

(58) Field of Classification Search .......... 712/200, 712/220, 225, 229; 713/300, 320, 322, 323
See application file for complete search history.

(56) References Cited

U.S. PATENT DOCUMENTS

| 4,001,690 | A | * | 1/1977 | Mack et al. ............... 455/13.2 |
| 4,550,369 | A | * | 10/1985 | Rokutanda et al. ......... 712/247 |
| 4,611,289 | A | | 9/1986 | Coppola |
| 5,021,679 | A | | 6/1991 | Fairbanks et al. |
| 5,072,376 | A | | 12/1991 | Ellsworth |
| 5,167,024 | A | | 11/1992 | Smith et al. |
| 5,218,704 | A | | 6/1993 | Watts, Jr. et al. |
| 5,268,845 | A | | 12/1993 | Startup et al. |
| 5,303,095 | A | * | 4/1994 | Vuong .......................... 360/46 |
| 5,365,552 | A | * | 11/1994 | Astle .......................... 375/354 |
| 5,396,635 | A | | 3/1995 | Fung |
| 5,408,639 | A | | 4/1995 | Gulick et al. |
| 5,410,711 | A | | 4/1995 | Stewart |
| 5,412,780 | A | * | 5/1995 | Rushton ..................... 711/113 |
| 5,416,726 | A | | 5/1995 | Garcia-Duarte et al. |
| 5,428,790 | A | | 6/1995 | Harper et al. |
| 5,442,794 | A | | 8/1995 | Wisor et al. |
| 5,461,266 | A | | 10/1995 | Koreeda et al. |
| 5,465,367 | A | | 11/1995 | Reddy et al. |
| 5,481,690 | A | | 1/1996 | Grumlose et al. |

(Continued)

FOREIGN PATENT DOCUMENTS

EP 0 617 812 B1 10/1994

(Continued)

OTHER PUBLICATIONS

U.S. Appl. No. 10/083,903, Mizuyabu et al.

(Continued)

*Primary Examiner*—A. Elamin
*Assistant Examiner*—Nitin C. Patel

(57) ABSTRACT

A system and method are provided for reducing power consumption within a video processing portion of a system. Activity associated with an instruction buffer is monitored to determine whether power consumption modes can be initiated within a system. If a number of pending instructions within an instruction buffer is greater than a particular threshold value, a normal mode of operation is initiated. If the number of pending instructions is less than the threshold value, the system is put in a reduced mode of operation. In the reduced mode of operation, processing is reduced to lower power consumption within the system. Accordingly, power consumption is altered to match a level of activity within the instruction buffer.

26 Claims, 5 Drawing Sheets

U.S. PATENT DOCUMENTS

| | | | |
|---|---|---|---|
| 5,523,724 A | | 6/1996 | Assar et al. |
| 5,524,249 A | | 6/1996 | Suboh |
| 5,532,524 A | | 7/1996 | Townsley et al. |
| 5,544,082 A | * | 8/1996 | Garcia-Duarte et al. .... 713/321 |
| 5,548,763 A | | 8/1996 | Combs et al. |
| 5,560,024 A | | 9/1996 | Harper et al. |
| 5,566,340 A | | 10/1996 | Stewart et al. |
| 5,615,376 A | | 3/1997 | Ranganathan |
| 5,623,677 A | | 4/1997 | Townsley et al. |
| 5,630,142 A | | 5/1997 | Crump et al. |
| 5,632,038 A | * | 5/1997 | Fuller .......................... 713/324 |
| 5,633,573 A | | 5/1997 | Van Phuoc et al. |
| 5,640,176 A | | 6/1997 | Mundt et al. |
| 5,646,508 A | | 7/1997 | Van Phuoc et al. |
| 5,652,502 A | | 7/1997 | Van Phuoc et al. |
| 5,652,891 A | * | 7/1997 | Kitamura et al. ........... 713/324 |
| 5,691,621 A | | 11/1997 | Phuoc et al. |
| 5,710,501 A | | 1/1998 | Van Phuoc et al. |
| 5,710,929 A | | 1/1998 | Fung |
| 5,721,933 A | | 2/1998 | Walsh et al. |
| 5,721,935 A | | 2/1998 | DeSchepper et al. |
| 5,727,221 A | | 3/1998 | Walsh et al. |
| 5,729,720 A | | 3/1998 | Kau et al. |
| 5,740,454 A | | 4/1998 | Kelly et al. |
| 5,748,972 A | | 5/1998 | Clark et al. |
| 5,754,436 A | | 5/1998 | Walsh et al. |
| 5,754,837 A | | 5/1998 | Walsh et al. |
| 5,754,869 A | | 5/1998 | Holzhammer et al. |
| 5,765,001 A | | 6/1998 | Clark et al. |
| 5,778,420 A | * | 7/1998 | Shitara et al. ............... 711/113 |
| 5,781,768 A | | 7/1998 | Jones, Jr. |
| 5,781,780 A | | 7/1998 | Walsh et al. |
| 5,805,907 A | * | 9/1998 | Loper et al. ................ 713/300 |
| 5,815,693 A | * | 9/1998 | McDermott et al. ......... 713/501 |
| 5,832,286 A | | 11/1998 | Yoshida |
| 5,845,132 A | | 12/1998 | Walsh et al. |
| 5,872,823 A | * | 2/1999 | Sutton ......................... 375/372 |
| 5,886,689 A | | 3/1999 | Chee et al. |
| 5,996,083 A | * | 11/1999 | Gupta et al. ................ 713/322 |
| 6,029,197 A | * | 2/2000 | Erimli et al. ................ 709/223 |
| 6,049,882 A | * | 4/2000 | Paver .......................... 713/322 |
| 6,078,319 A | | 6/2000 | Bril et al. |
| 6,188,703 B1 | * | 2/2001 | Dobson et al. .............. 370/537 |
| 6,201,817 B1 | * | 3/2001 | Sullivan ...................... 370/463 |
| 6,243,820 B1 | * | 6/2001 | Rosch .......................... 713/322 |
| 6,332,196 B1 | * | 12/2001 | Kawasaki et al. .......... 713/300 |
| 6,373,282 B1 | * | 4/2002 | Drapkin et al. ................ 326/68 |
| 6,430,693 B1 | * | 8/2002 | Lin ............................. 713/322 |
| 6,456,702 B1 | * | 9/2002 | Nishihara ................ 379/93.05 |
| 6,460,125 B1 | * | 10/2002 | Lee et al. .................... 711/167 |
| 6,462,689 B1 | * | 10/2002 | Wong et al. ................. 341/144 |
| 6,463,542 B1 | * | 10/2002 | Yu et al. ...................... 713/320 |
| 6,590,730 B1 | * | 7/2003 | Veltchev et al. .............. 360/69 |
| 6,608,476 B1 | * | 8/2003 | Mirov et al. ............ 324/103 R |
| 6,678,737 B1 | * | 1/2004 | Bucher ....................... 709/231 |
| 6,765,873 B1 | * | 7/2004 | Fichou et al. ............... 370/235 |
| 6,775,787 B1 | * | 8/2004 | Greene ....................... 713/340 |
| 6,832,280 B1 | * | 12/2004 | Malik et al. ................ 710/200 |
| 6,888,840 B1 | * | 5/2005 | Ramaswamy et al. ...... 370/412 |
| 2002/0129379 A1 | * | 9/2002 | Levinson et al. ........... 725/129 |
| 2003/0088755 A1 | * | 5/2003 | Gumunson et al. ........... 712/25 |

FOREIGN PATENT DOCUMENTS

| | | |
|---|---|---|
| EP | 0 632 360 A1 | 1/1995 |
| EP | 0 645 689 A2 | 3/1995 |
| EP | 0 675 425 A2 | 10/1995 |
| JP | 04085645 A * | 3/1992 |

OTHER PUBLICATIONS

U.S. Appl. No. 10/083,917, Mizuyabu et al.

Cirrus Logic; CL-GD755X Application Book; Mar. 1997; Revision 2.0; Stock #367555-002.

Burd, et al.; "Processor Design for Portable Systems"; Department of EECS, University of California at Berkeley; pp. 1-25.

Ballou, et al.; "Technique for Monitoring a Computer System's Activity for the Purpose of Power Management of a DOS-Compatible System"; Sep. 1990; IBM Technical Disclosure Bulletin; https://www.delphion.com/tdbs.

* cited by examiner

SYSTEM 100

SYSTEM FOR REDUCED POWER CONSUMPTION BY MONITORING INSTRUCTION BUFFER AND METHOD THEREOF

PRIORITY APPLICATION

This patent application claims benefit under 35 U.S.C. 119(e) of the U.S. Provisional application No. 60/345,100 filed on Jan. 4, 2002, entitled: "SYSTEM FOR REDUCED POWER CONSUMPTION.

CO-PENDING APPLICATIONS

This application is related to U.S. patent application Ser. No. 10/083,917 entitled "SYSTEM FOR REDUCED POWER CONSUMPTION BY MONITORING VIDEO CONTENT AND METHOD THEREOF", filed on Feb. 27, 2002, and U.S. patent application Ser. No. 10/083,903 entitled "SYSTEM FOR REDUCED POWER COMSUMPTION BY PHASE LOCKED LOOP AND METHOD THEREOF" filed on Feb. 27, 2002.

FIELD OF THE DISCLOSURE

The present invention relates generally to reducing system power consumption and more specifically to bypassing system components to reduce power consumption.

BACKGROUND

Handheld devices, such as personal digital assistants (PDA) and mobile phones, are now being equipped with hardware and software to handle several different computing tasks. Handheld devices are being equipped with communications adapters to allow the handheld devices to access the Internet, other handheld devices, and other information handling systems. Handheld devices are also being used to process multimedia data, such as audio and video data. Many handheld devices are capable of playing video on an integrated screen. Handheld devices are being integrated with more components to handle the increased functionality. However, as more components are integrated with the handheld devices and as processing increases, the handheld devices draw more power.

Power is limited on most handheld devices. Most desktop computers take power from a power supply connected to an alternating current (AC) power outlet and generally don't need to worry about conserving power. Handheld devices generally take their power from standard power cells. Handheld devices are designed to be small and light to make them portable for consumers. The power cells are generally selected to be small and light to not hinder the handheld device. However, the increased processing performed to handle new functionality, such as communications or multimedia playback, takes more power from the handheld devices than general processing tasks the handheld devices were originally used for.

Current methods of reducing power consumption are not adequate. To conserve power, a handheld device may reduce the speed at which its central processing unit (CPU) is run. However, inhibiting the CPU reduces the performance of the handheld device in most or all of the functions of the handheld device. Alternatively, specific functions or hardware components within the handheld device may be completely disabled to conserve power. However, completely disabling functions within the handheld device reduces a stability expected by a user. Power-saving modes can be enabled through software by having a software application decide processing can be reduced. However, such applications are not generally aware of the effect of running in a reduced power mode on other components within the device. The application may not be aware of all the processes running within the device. From the above discussion, it is apparent that an improved method of conserving power within a system would be useful.

BRIEF DESCRIPTION OF THE DRAWINGS

Specific embodiments of the present disclosure are shown and described in the drawings presented herein. Various objects, advantages, features and characteristics of the present disclosure, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

FIGS. 1–5 illustrate methods of conserving power within a system. System properties are analyzed to initiate a power saving mode. A method of the present disclosure includes identifying an operating characteristic based on a number of commands queued in an instruction buffer. The operating characteristic can include the number of pending instructions in the instruction buffer or a rate of change in the number of pending instructions in the instruction buffer. The method further includes adjusting a system characteristic based on the operating characteristic. The system characteristics are adjusted to modify power consumption within a system. If the operating characteristic indicates system processing is low, such as due to a low number of pending instructions, the system properties that consume power, such as a clock rate, can be reduced to lower the power consumption. The present disclosure has the advantage of conserving power in a specific system component in response to operations associated with an instruction buffer.

Figure 1:
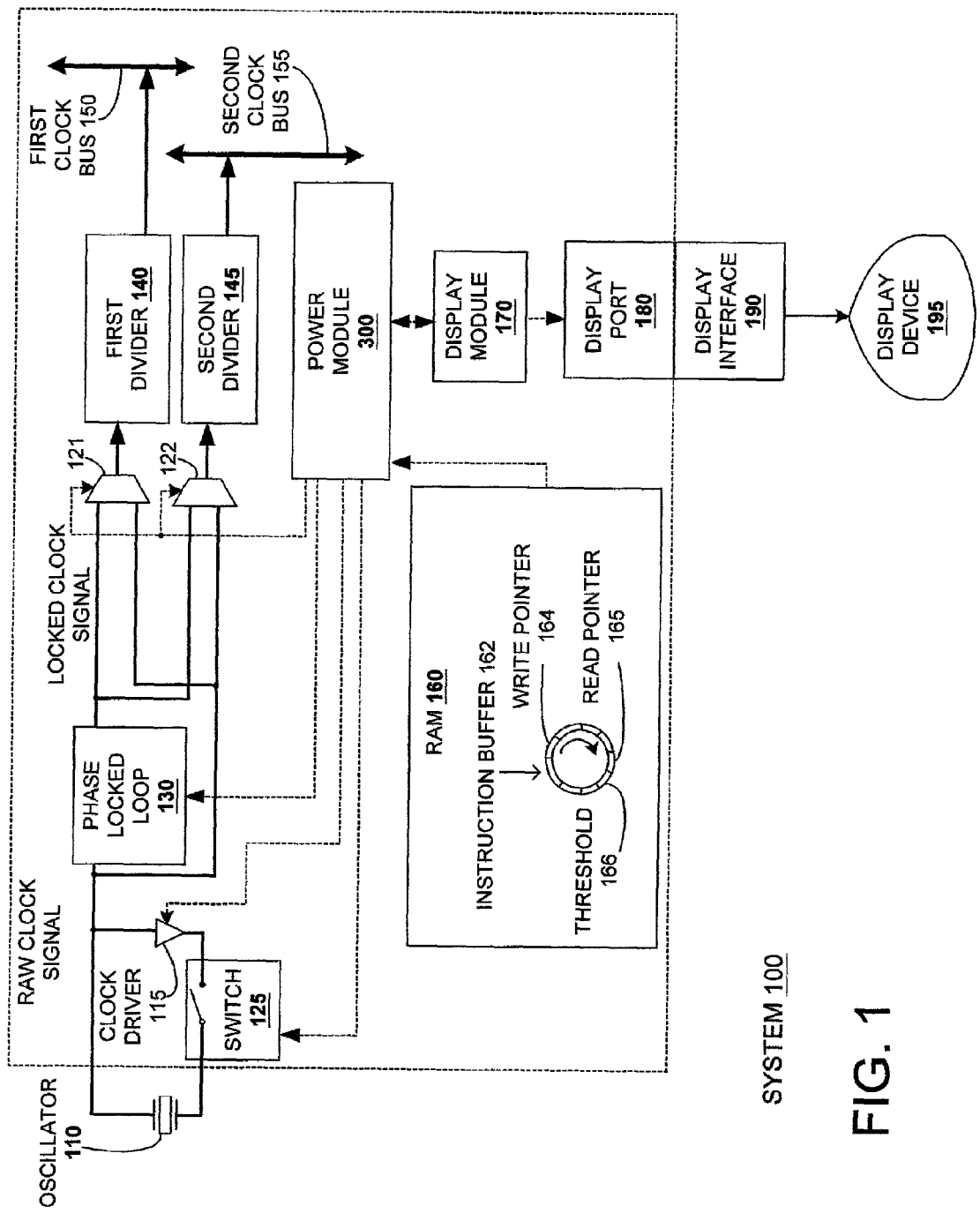
FIG. 1 is a block diagram illustrating a system with provisions for conserving power, according to one embodiment of a present invention.

Referring now to FIG. 1, a block diagram illustrating a system with provisions for conserving power is shown, according to one embodiment of the present invention. In one embodiment of the present disclosure, system 100 handles video processing functions within a personal digital assistant (PDA) handheld device. A power module 300 initiates power conservation modes within system 100. In one embodiment of the present disclosure, power module 300 monitors properties of system 100, such as a fullness of instruction buffer 162 or changes in video content to be displayed. These system properties are used to determine a level of processing which is needed. When the properties of system 100 indicate a low or reduced level of processing is needed, power module 300 initiates power conservation modes. While system 100 is described in reference to a display data processing portion of a PDA, it should be appreciated that other forms of information handling systems or devices may be used. Furthermore, the methods and systems described herein would be useful to any such devices where power consumption is a concern.

An oscillator 110 is coupled to clock driver 115 to generate a raw clock signal for specific operations within system 100. Oscillator 110 produces the raw clock signal at a fixed frequency. Higher frequencies operations may be desired than can be generated through oscillator 110. Accordingly, a phase locked loop (PLL) 130 is used to generate a stable, locked clock signal from the raw clock signal generated by oscillator 110. PLL 130 is generally used to generate multiplied clock signals based on the raw clock signal generated by oscillator 110. It should be appreciated that oscillator 110 may include various oscillators. For example, various resistor/capacitor (RC) circuits or crystal oscillators may be used in place of oscillator 110 without departing from the scope of the present disclosure.

Several components of PLL 130 are used to generate a signal locked to the phase of the raw clock signal. The PLL 130 works as a control loop, attempting to correct for erratic changes in phase or frequency between the raw clock signal generated through oscillator 110 and a signal generated internal to the PLL 130. In one embodiment, PLL 130 includes a phase comparator (not shown) to identify a difference in phase or frequency between the raw clock signal and the internal signal generated by PLL 130. The comparator can include components or flops to generate a difference signal between the internal signal and the raw clock signal. The difference signal is provided to a filter (not shown), which generates a voltage signal associated with the difference signal. The voltage signal is provided to a voltage controlled oscillator (VCO, not shown) that generates an oscillating signal associated with the voltage signal. The oscillating signal is used as the internal signal mixed with the input raw clock signal. Accordingly, the oscillating signal may be output from the PLL 130 as a locked clock signal.

In one embodiment, the locked clock signal is coupled to a set of dividers 140 and 145. In a normal operating mode, the set of dividers 140 and 145 generate clock signals based on the locked clock signal from PLL 130. In one embodiment, the first divider 140 provides a first divided clock signal to the first clock bus 150. The second divider 145 provides a second divided clock signal, with a lower frequency than the first divided clock signal, to the second clock bus 155. The clock busses 150 and 155 may then be used to provide clock signals for various processing performed by system 100. It should be appreciated that more or less clock busses can be used without departing from the scope of the present disclosure.

In one embodiment, a power module 300 initiates several power modes within system 100. The power module 300 first identifies a processing status of system 300. The status provides an indication of a level of activity, process or power consumption expected by system 100. For example, power module 300 may monitor a number of instructions being stored in random access memory (RAM) 160. Instructions to be processed are stored in an instruction buffer 162 of RAM 160. RAM 160 can include various forms of memory, such as static dynamic random access memory (SDRAM) or dynamic random access memory (DRAM), without departing from the scope of the present disclosure.

Instruction buffer 162 includes a set of memory addresses of RAM 160 in a linked configuration. Instruction buffer 162 includes a write buffer 164 to identify a memory address within instruction buffer 162 where a new instruction is to be stored. A read pointer 165 identifies a memory address within instruction buffer 162 where the next instruction to be processed is read. As more instructions are pending, the number of linked memory addresses between write buffer 164 and read buffer 165 increases. In one embodiment, a threshold 166 is used to identify when the number of instructions pending in instruction buffer 162 has increased or decreased past a limit. It should be noted that the number of linked addresses within instruction buffer 162 can be fixed or dynamic. If the number of linked addresses within the instruction buffer 162 is fixed, the instruction buffer includes a set maximum number of pending instructions that can be supported. Accordingly, pending instructions may need to be dropped if a current number of pending instructions reached the maximum number of pending instructions. If the number of linked addresses within the instruction buffer is dynamic, memory addresses are dynamically allocated to instruction buffer 162 to meet a particular demand. While the size of the instruction buffer can increase as more instructions are received, there may not be enough time to adequately process all the instructions if the number of pending instructions is too high.

Furthermore, the types of instructions stored in instruction buffer 162 may be altered without departing from the scope of the present disclosure. In one embodiment, the types of instructions stored in instruction buffer 162 include display instructions for presenting video or graphics through display 195. It should be appreciated that the instructions may include other instructions, such as multimedia processing instructions, such as video and/or audio processing commands. While instruction buffer 162 is shown as a part of RAM 160 and system 100, it should be noted that instruction buffer 162 can be stored external to system 100.

By monitoring the number of instructions in instruction buffer 162, power module 300 may determine that an increased level of processing will be needed to process the number of pending instructions within a particular amount of time. For example, if a number of pending instructions is greater than a threshold 166, or an increasing rate of the number of pending instructions is greater than a particular value, power module 300 initiates a normal, or high reliability, power mode, in which all or most power is available to system 100. The normal power mode insures the instructions are processed using all available resources of system 100. Alternatively, if read pointer 165 falls below threshold 166, power module 300 may initiate a power conservation mode. Since the number of instructions to be processed is lower than normal, power module 300 can conserve excess power without overflowing the instruction buffer 162.

In one embodiment, power module 300 monitors a rate of change of the number of instructions in instruction buffer 162. If the number of instructions is increasing at a specific rate, power module 300 may switch from a power conservation mode to a normal power mode to anticipate an upcoming high demand for processing. Furthermore, power module 300 can be used to monitor the types of instructions stored in instruction buffer 162. For example, instruction buffer 162 may store a number of instructions lower than threshold 166; however, the number of instructions can include process intensive instructions. Alternatively, the number of instructions may include simple instructions that can be processed quickly. Accordingly, power module 300 can initiate power conservation modes based on an amount of processing needed by the type of instructions stored in instruction buffer 162.

Power module 300 can activate measures to respond to an identified power mode. When a normal power mode is initiated, power module 300 can provide power to all components of system 100. For example, power module 300 can provide the raw clock signal generated by oscillator 110 to the input of PLL 130. When a power conservation mode is initiated, power module 300 bypasses the locked clock signal output by PLL 130. For example, in one embodiment, the locked clock signal output from the PLL 130 and the raw clock signal from the oscillator 110 are provided to a set of multiplexors 121 and 122. In a normal mode of operation, multiplexers 121 and 122 provide the locked clock signal to clock busses 150 and 155, respectively. When the power conservation mode is initiated, the power module 300 sets multiplexors 121 and 122 to only use the raw clock signal output by the oscillator 110. Accordingly, during power conservation modes, the raw clock signal5 can be used as a clock source for dividers 140 and 145.

The clock signal output by dividers 140 and 145 are provided to clock busses 150 and 155, respectively, and used for processes within system 100. While the raw clock signal generated by oscillator 110 may not be as fast or as stable as the locked clock signal generated through PLL 130, the raw clock signal may be an adequate source for the second divider 145, running at a slower speed than the first divider 140.

To conserve power, power module 300 can also set the PLL 130 into a power down mode during the power conservation mode. In one embodiment PLL 130 is powered down by disabling clock signals input into the PLL 130. A switch (not shown) can be provided to disable input of the raw clock signal generated through oscillator 110 to the PLL 130. Alternatively, PLL 130 can be shut off by cutting power to the PLL 130. However, it should be noted that as the PLL 130 may be a complementary metal oxide semiconductor (CMOS) device, it may be preferable to disable a clock signal provided to PLL 130 in place of disabling power provided to PLL 130.

In one embodiment, power module 300 is capable of setting multiplexors 121 and 122 independently of each other. Accordingly, multiplexor 121 can be set to use the locked clock signal while multiplexor 122 is set to use the raw clock signal. Alternatively, a single multiplexor can be used in place of multiplexors 121 and 122 to provide either the locked clock signal or the raw clock signal to first divider 140 and/or second divider 145.

In one embodiment, power module 300 monitors display content. For example, power module 300 monitors received display data, or compares a new set of display data to an old set of display data, to determine if the display content has changed. If the display content has not changed recently, power module 300 initiates a power conservation mode. If the display content has changed, the power module 300 may switch to, or remain in, the normal mode.

In one embodiment, when in a power conservation mode, power module 300 sends signals to enable power saving features through a display module 170. In one embodiment, display module 170 controls a number of bits used to represent display data sent through display port 180. To conserve power, display module 170 may be directed to use fewer bits to represent some or all bits of the display data.

In on embodiment, a number of bits used to represent color is reduced. For example, the color depth of the display data can be reduced from 32-bit color to 16- or 8-bit color. The display data is provided to a display device 195, through display interface 190. Display port 180 and display interface 190 use a set number of interface lines to transfer display data to display device 195. In one embodiment, when fewer bits are used to represent the display data, less communications lines may need to be powered. Accordingly, less power is needed to transfer the display data from display port 180 to display device 195, through display interface 190.

The display interface 190 includes various interface adapters for transporting the display data to the display device 195, such as a digital to analog converter (DAC), a transition minimized differential signaling (TMDS) transceiver, or a low voltage differential signaling (LVDS) transceiver, without departing from the scope of the present disclosure. While interface input lines can be disabled to reduce power, it should be appreciated that simply transmitting less data can conserve a substantial amount of power. Accordingly, a frame rate or a refresh rate associated with the display data being sent to display device 195 can be reduced to conserve power. As display content may not be changing, display module 170 can reduce the number of frames per second being displayed on display device 195 without drastically affecting the appearance of content displayed on the display device 195. A bit depth used to represent other forms of multimedia data may also be reduced to lower power consumption. For example, a number of bits used to represent audio data may also be reduced to simplify multimedia processing and conserve power. Accordingly, power consumption can be reduced by having less data being transferred from display port 180 per unit time. In one embodiment, slower clock signals can be used to process multimedia data represented with a lower bit depth than multimedia data with a higher or normal bit-depth. In one embodiment, display device 195 includes a display device associated with a PDA, such as a liquid crystal display screen.

Power module 300 can initiate other forms of power conservation modes. In one embodiment, power module 300 initiates a suspend mode. Power module 300 can determine when system 100 has not been used for an extended period of time. If a lack of video data has been sent to system 100 or an information handling system interfaced with system 100 has not been active for a particular period of time, power module 300 initiates a suspend mode. Furthermore, if no instructions are provided to system 100, power module 300 can initiate the suspend mode. In one embodiment, power module disables oscillator 110 as part of the suspend mode. Power module 300 may provide a signal to switch 125 to disable a signal provided from clock driver 115 to oscillator 110. Alternatively, power module 300 may disable power to the clock driver 115 to disable oscillator 110 and the raw clock signal. Furthermore, power module 300 may provide a signal to display module 170 to disable display data output through display port 180.

In one embodiment, power module 300 controls an amount of power provided to system 100. Power module 300 may reduce a total amount of power provided to system 100 to match less power needed in power conservation modes, in comparison to a normal or nominal power mode. It should be appreciated that other forms of power conservation may also be incorporated without departing from the scope of the present disclosure.

Figure 2:
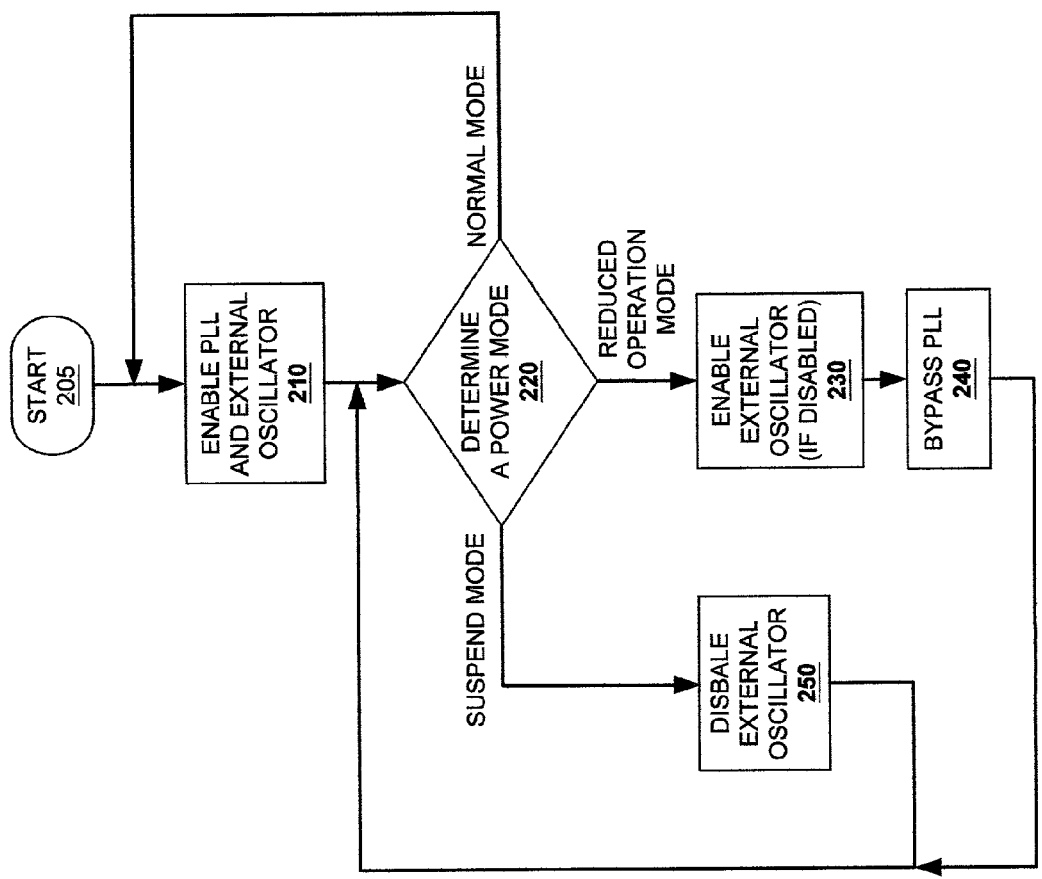
FIG. 2 is a flow diagram illustrating a method of identifying and initiating power conservation modes within a system, according to one embodiment of the present invention.

Referring now to FIG. 2, a flow diagram illustrating a method of identifying and initiating power conservation modes within a subsystem of an information handling system is shown, according to one embodiment of the present invention. The subsystem, such as system 100 (FIG. 1), may represent a portion of processing performed within the information handling system. For example, the subsystem may be used to handle video display for a portable information handling system, such as a PDA. A power module, such as power module 300 (FIG. 1), monitors activity within the subsystem. When activity within the subsystem is reduced, the power module initiates a power conservation mode.

In step 205, the power module sets the subsystem to a normal operating mode. In step 210, in accordance with the normal operating mode, the power module enables an external oscillator, such as oscillator 100 (FIG. 1), and a PLL, such as PLL 130 (FIG. 1), associated with the subsystem. The power module may enable the external oscillator by providing power to a clock driver coupled to the external oscillator. The PLL may be enabled through a switch used to provide a clock signal generated by the external oscillator to the PLL. Alternatively, enabling the PLL can include enabling the output of the PLL to be provided to the subsystem. The power module may also allocate a normal or nominal amount of power to the subsystem and components within the subsystem. In one embodiment, the power module also enables the clock output from the PLL to be used by several components of the subsystem.

In step 220, the power module monitors the status of components of the subsystem to identify a level of activity and an appropriate power mode. In one embodiment, the power module monitors a number of pending instructions to determine the power mode. For example, if the number of pending instructions has increased greater than a threshold, the power module may determine a normal, or high-reliability, power mode is necessary to ensure all the instructions are processed in time. Alternatively, if the number of pending instructions is less than the threshold, the power module may determine the subsystem may operate in a reduced operation mode, wherein power can be conserved. Furthermore, if no instructions are pending, the power module may determine that processing within the subsystem may be suspended by hardware components of the subsystem.

The power module may also monitor display content to determine a mode of operation or a power mode to employ. The power module may monitor the display content to determine if new content is to be displayed. If new display content is identified, the power module may determine a normal power mode is needed. If new display content is not different from old display content, the power module may determine the subsystem should be in a reduced operation mode to conserve power.

If a normal mode is to be used, the power module initiates a normal power mode in the device, such as previously discussed in reference to step 210. Alternatively, if a reduced operation mode is to be used, the power module initiates a power conservation mode. Accordingly, in step 230, the power module ensures the external oscillator is enabled. In step 240, the PLL is bypassed. In one embodiment, the power module sets a switch or multiplexor to route a clock signal associated with the external oscillator to a clock divider coupled to the output of the PLL in the normal mode. The PLL can also be placed in a power down mode to conserve power while the PLL is bypassed and not being used. In one embodiment, the power module sets a PLL indicator to notify other portions of the subsystem that the PLL is disabled. A delay may need to be provided to allow particular portions of the subsystem time to switch to using the external oscillator for a clock source. Clock signals in the reduced operation mode may be divided to run processes slower than in the normal mode to account for a lack of stability associated with the clock signal generated by the external oscillator in comparison to a PLL output signal. Other forms of power conservation may also be employed in the reduced operation mode. For example, the power module may set the subsystem to represent display data with a reduced number of bits. Accordingly, a number of active interface input lines used to transmit display data to a display device, such as a PDA screen, may be reduced. A frame rate used to update video on a display device can also be reduced to conserve power.

If a suspend mode is to be used, the power module initiates a suspend mode in which several operations within the subsystem are disabled. Accordingly, in step 250, the external oscillator is disabled. In one embodiment, a connection between the external oscillator and a clock driver is broken to disable the external oscillator. Furthermore, a driver signal generally provided to the external oscillator may be replaced with a ground signal. In one embodiment, steps are taken to place the subsystem into the reduced operation mode before initiating the suspend mode. The power module may provide a signal or set an indicator to notify other portions of the subsystem that a suspend mode will be initiated. It should be noted that hardware components may be necessary to transition out of a suspend mode. In one embodiment, the power module uses hardware components to monitor system properties to re-enabling subsystem functions when returning from the suspend mode. The hardware components may monitor user interface buttons. When a user has pressed a user interface button, the hardware components return from the suspend mode to a normal power mode. It should be appreciated that other modes of operation and other forms of conserving power can be employed without departing from the scope of the present invention.

Figure 3:
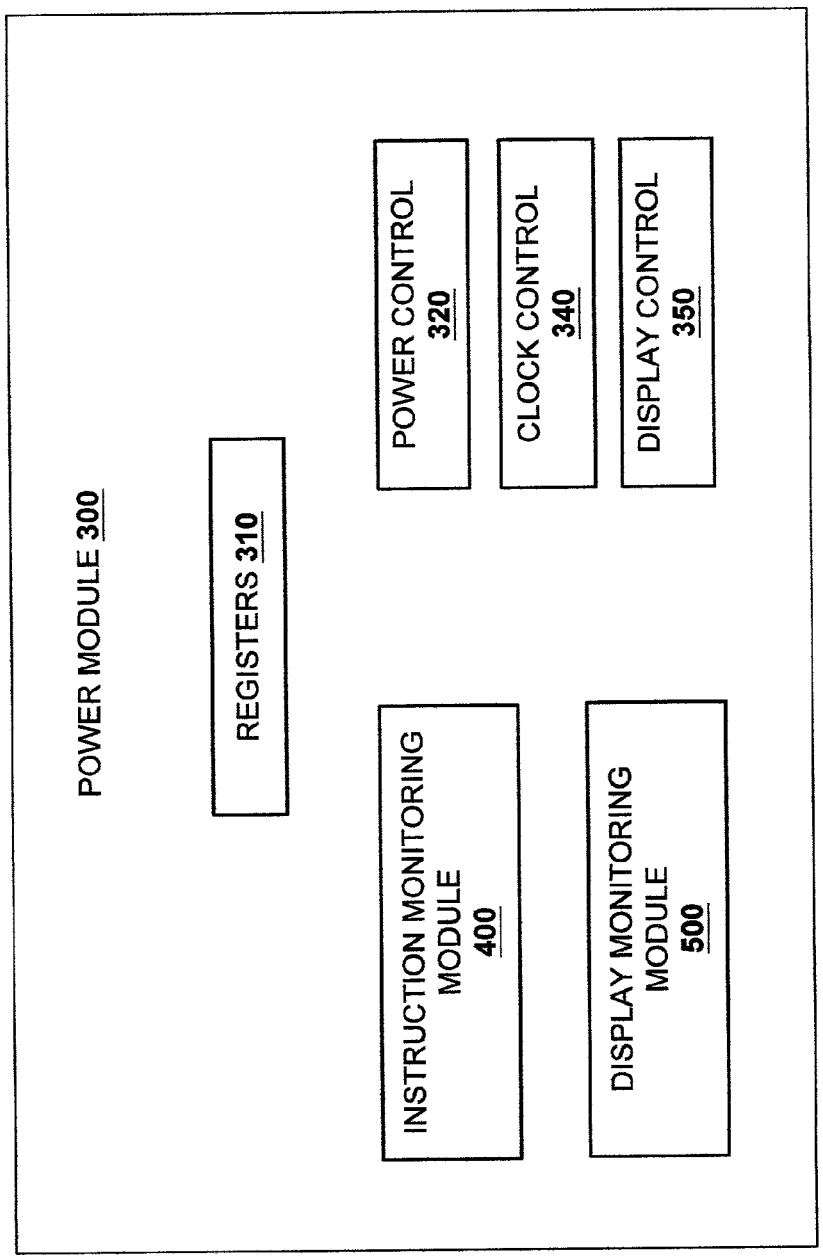
FIG. 3 is a block diagram illustrating a module for initiating power conservation modes within the system of FIG. 1, according to one embodiment of the present invention.

Referring now to FIG. 3, a block diagram illustrating a module for initiating power conservation modes within the system of FIG. 1 is shown, according to one embodiment of the present disclosure. A power module 300 monitors activity within a subsystem, such as system 100 (FIG. 1). Dependent on operating characteristics associated with processes in the subsystem, such as a number of pending instructions or changes in display content, the power module 300 may initiate a power conservation mode.

Several components of power module 300 may be used to identify levels of activity within the subsystem. For example, an instruction-monitoring module 400 monitors a number of pending instructions. In one embodiment, instruction-monitoring module 400 compares the number of pending instructions to a threshold value. If the number of pending instructions is less than the threshold, power module 300 initiates a reduced operation, or reduced power, mode. Instruction-monitoring module 400 can also be used to monitor a rate of change in the number of pending instructions, as will be subsequently discussed in reference to FIG. 4.

A display-monitoring module 500 may be used to monitor operating characteristics associated with content to be displayed. Display-monitoring module 500 may notify power module 300 when display content has or has not changed. If the display content has not changed, the power module 300 may initiate a power conservation mode to make use of the lack of new display content.

Several controls within power module 300 can be used to initiate power conservation modes. For example, a clock control 340 can be used to apply controls to clocks used within the subsystem. For example, clock control 340 may be used to disable a PLL in a reduced operation mode. Clock registers of registers 310 may be set to indicate to other components of the subsystems that the PLL has been disabled. Clock control 340 may control a switch or multiplexor to route a clock signal generated by an external oscillator to dividers coupled with the disabled PLL. Clock control 340 may also notify other components to switch to the clock signal generated by the external oscillator in place of the clock signal output by the PLL in a normal mode. Furthermore, clock control 340 may be used to disable the external oscillator in a suspend mode in which most or all clocked operations in the subsystem are disabled.

A display control 350 can be used to reduce power associated with display elements in a reduced operation mode. In one embodiment, display control 350 is used to reduce a number of bits used to represent display data. For example, a color depth used to represent pixel elements may be changed. By reducing the number of bits used to represent display data, a number of communications or control lines activated to transfer video data from the subsystem to an interfaced display device or display screen can be reduced. By reducing the number of active interface lines, an amount of power needed to transfer the display data to the display device may be reduced. It should be appreciated that simply providing less data to the display device or display screen can substantially reduce power consumption. For example, a refresh rate associated with the display device or display screen can be reduced to conserve power. Furthermore, display data may be processed within the subsystem more quickly. A lower clock speed may be used to process the display data with the reduced number of bits. Accordingly, the display data may be reliably processed in a reduced operation/power mode.

A power control 320 can be used to control an amount of power provided to the subsystem. As a power conservation mode may be initiated, less power is needed by the subsystem. Power conservation techniques employed by the power module 300, such as disabling the PLL or reducing the number of bits used to represent display data, reduce the total amount of power consumed by the subsystem. Accordingly, power control 320 may be used to reduce the total power provided to the subsystem. Power module 320 may reduce or disable power provided to particular components, such as the clock driver, in response to particular power conservation modes in place.

Registers 310 may be used to enable or disable particular power conservation modes or techniques. Registers 310 can also be used to indicate to other system components that a particular power mode is being implemented. Registers 310 also allow for several properties concerning transitions between power modes to be controlled. Table 1 provides a list of possible registers of registers 310 which may be used, according to one embodiment of the present disclosure.

TABLE 1

| REGISTER | DESCRIPTION |
| --- | --- |
| POWER MANAGEMENT ENABLE | ENABLES POWER MANAGEMENT WITHIN THE POWER MODULE |

TABLE 1-continued

| REGISTER | DESCRIPTION |
| --- | --- |
| CURRENT POWER MODE | STORED AN IDENTIFIER FOR THE CURRENT POWER CONSERVATION MODE |
| POWER MODE REQUEST | SOFTWARE TRANSITION BETWEEN POWER CONSERVATION MODES IF DIFFERENT FROM CURRENT |
| NORMAL/SLOW HARDWARE ENABLE | ENABLES HARDWARE CONTROL FOR TRANSITIONING FROM A NORMAL MODE AND A POWER CONSERVATION MODE |
| NORMAL-SLOW CONDITIONS | DEFINES CONDITIONS FOR HARDWARE TO TRANSITION FROM A NORMAL MODE TO A REDUCED |
| SLOW-NORMAL HARDWARE ENABLE | ENABLES HARDWARE CONTROL FOR TRANSITIONING FROM A REDUCED OPERATIONS MODE TO A NORMAL |
| SLOW-NORMAL CONDITIONS | DEFINES CONDITIONS FOR TRASNITIONING FROM A REDUCED OPERTIONS MODE TO A NORMAL MODE |
| WAKEUP CONDITIONS | DEFINES CONDITIONS HARDWARE USES FOR WAKING FROM A SUSPEND MODE |

Registers of register 310 can be used by components external to power module 300 to enable particular power conservation modes. A power management enable register can be used to enable or disable operation of the power module 300. If power module 300 is disabled, the system may be set to run in only the normal power mode. Accordingly, user preferences may be linked to disable power conservation modes through the power management enable register. Registers 310 can also include a current power mode register that defines the current or active mode. A power mode request register can be used to force the power module 300 into a new power mode. Conditions for transitioning between power modes may also be set through registers 310. For example, a wakeup condition register may be used to indicate different triggers to monitor for returning from a suspended operation mode. For example, the wakeup condition register may indicate the power module 300 should only leave a suspend mode when a power button or switch is activated by the user.

Figure 4:
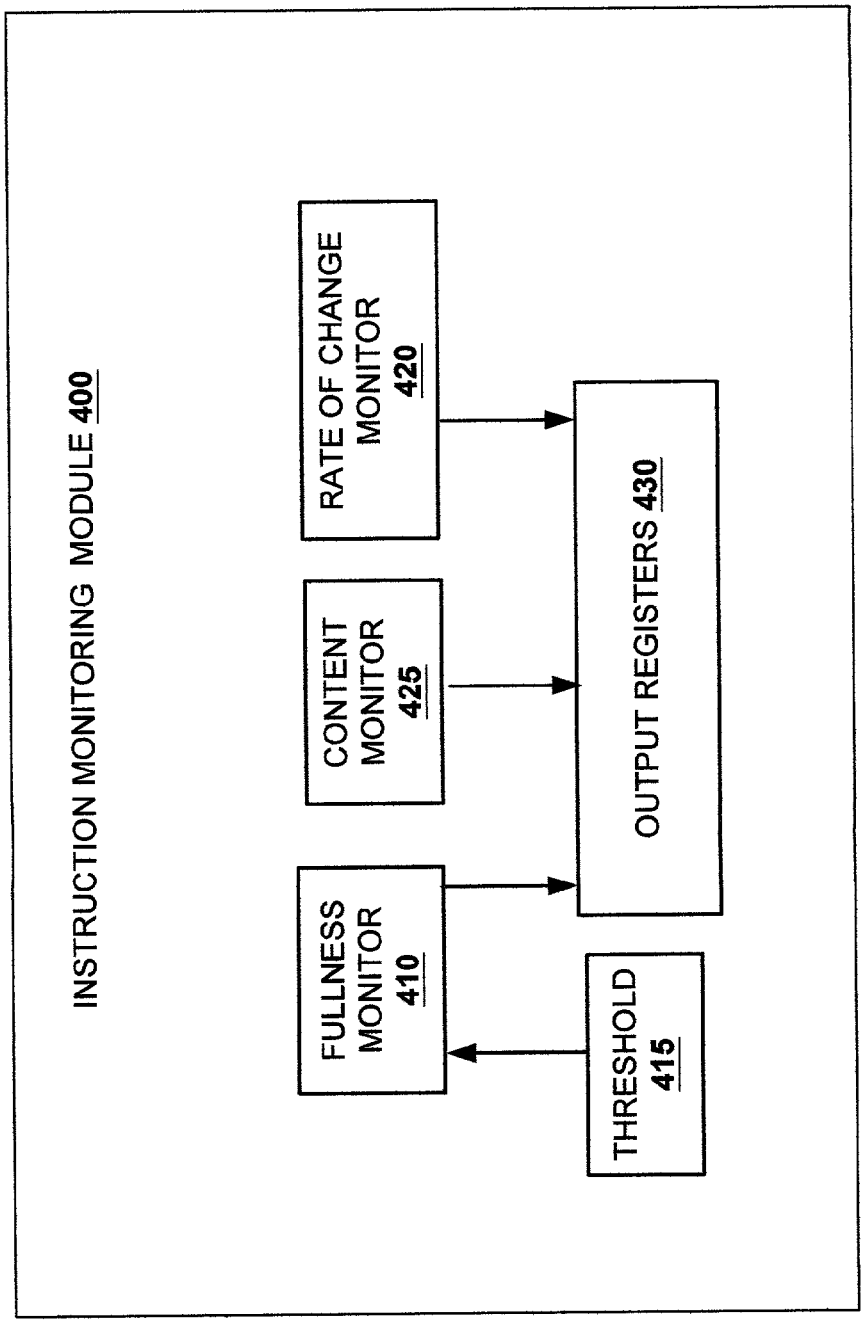
FIG. 4 is a block diagram illustrating a module for monitoring a number of instructions to be processed, according to one embodiment of the present invention.

Referring now to FIG. 4, a block diagram illustrating a module for monitoring a number of instructions to be processed is shown, according to one embodiment of the present invention. Instruction-monitoring module 400 monitors a number of instructions pending. Instruction monitor module 400 provides analysis on pending instructions to a module capable of transitioning among power conservation modes, such as power module 300 (FIG. 3).

A fullness monitor 410 tracks a fullness of an instruction buffer, such as instruction buffer 162 (FIG. 1). New instructions to be processed are stored in memory, such as in instruction buffer 162. Once a system, such as system 100 (FIG. 1), is ready to process a new instruction, the instruction is read and removed, or de-allocated, from the instruction buffer. Dependent on a current level of activity in the system, the instruction buffer may fill with new pending instructions faster than old instructions are read. A threshold 415 may be used to compare a current number of pending instructions to a level of activity. In one embodiment, as the number of pending instructions increases greater than the threshold, the level of activity is considered high and may be reported as high through output registers 430. Accordingly, the power module may use the reported level of activity to determine the system should be in a normal power mode, wherein all clocks and system components are allowed to operate.

Alternatively, the number of pending instructions may be equal to or less than the threshold 415. The fullness monitor 410 provides an indicator through output registers 430 that the level of activity is low. The power module can use the reported level of activity to initiate a reduced operation mode in which power to some components is disabled. Furthermore, slower clocks signals can be used to conserve power.

A rate of change monitor 420 is used to monitor a rate of change in the number of pending instructions in the instruction buffer. The rate of change monitor 420 may calculate the rate of change in the number of pending instructions tracked through fullness monitor 410. If the number of pending instructions increases at a high rate, the rate of change monitor 420 may provide a warning of increased activity to the power module, through output registers 430. The power module may use the warning to switch from a reduced operations mode to a normal mode. Accordingly, the rate of change monitor 420 allows the power module to anticipate and react to the changes in the level of activity. In one embodiment, the fullness monitor 410 and rate of change monitor 420 include discrete components for monitoring the instruction buffer. For example, fullness monitor may include logic circuitry to toggle a flag on output registers 430 to indicate a particular power mode when a memory address being written to matches threshold 415. In one embodiment, instruction-monitoring module 400 forms a part of a hardware subsystem to process display instructions associated with a PDA.

Instruction-monitoring module 400 can also include a content monitor 425. Content monitor 425 monitors the types of instructions stored in the instruction buffer to anticipate an amount of processing that may be needed to process the instructions. Content monitor 425 can provide set an indicator through output registers 430 based on a level of processing intensity associated with the instructions stored in the instruction buffer. A first indicator can be used to indicate at least a majority of the instructions in the instruction buffer require minor processing and a second indicator can be used to indicate intensive processing is needed to process the instructions in the instruction bugger. Furthermore, the content monitor 425 can provide a number of instructions of a first type, requiring minor processing, and a number of instructions of a second type, requiring intensive processing. Accordingly, the power module can determine whether or not to enter a power conservation mode based on the types of instructions to be processed.

Figure 5:
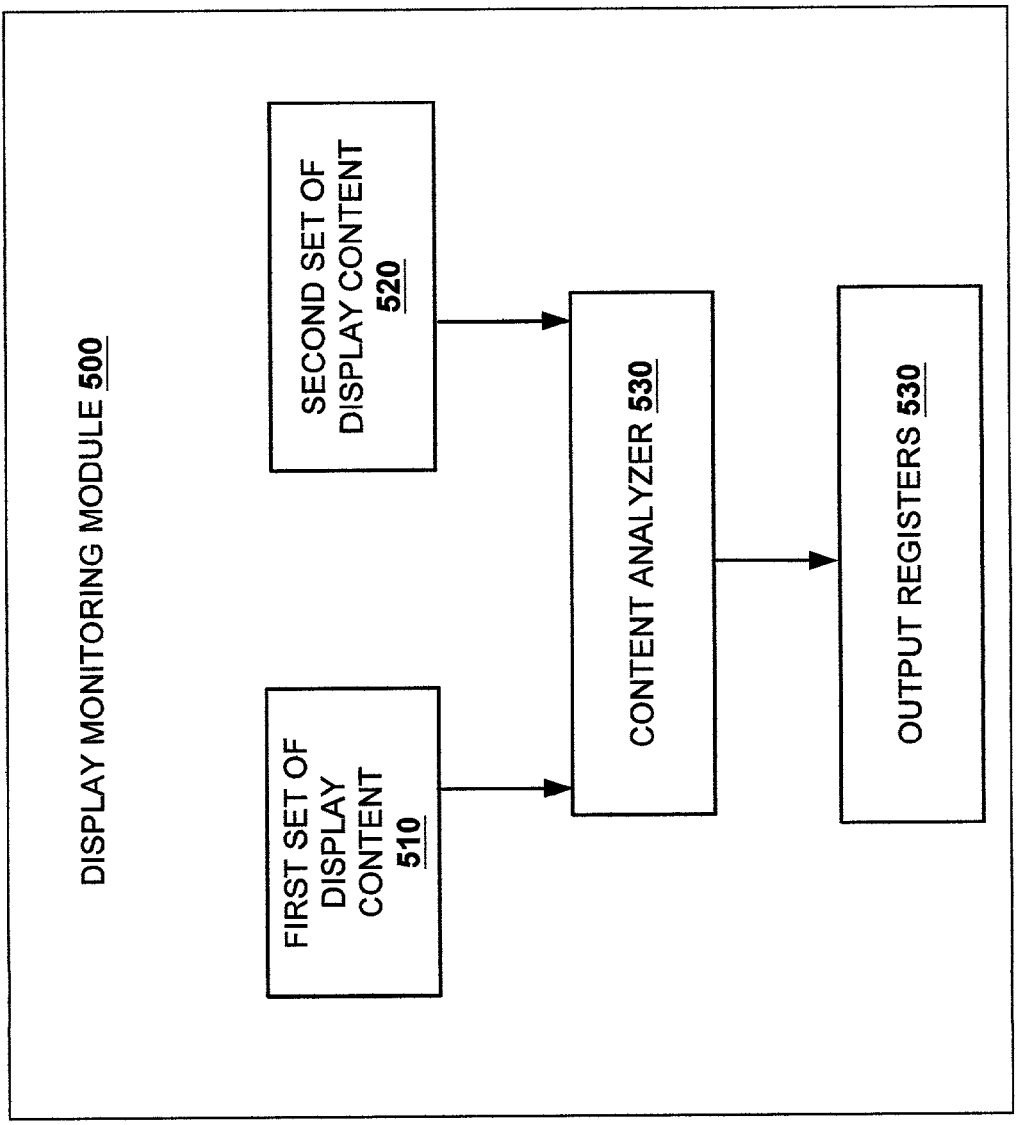
FIG. 5 is a block diagram illustrating a module for identifying changes in display content, according to one embodiment of the present invention.

Referring now to FIG. 5, a block diagram illustrating a module for identifying changes in display content is shown, according to one embodiment of the present invention. A display-monitoring module 500 is used to analyze display activity. Display-monitoring module 500 analyzes display activity to provide a power module, such as power module 300 (FIG. 3), to ascertain a level of activity associated with a system, such as system 100 (FIG. 1).

In one embodiment, to determine when changes in display content have occurred, display-monitoring module 500 analyzes different sets of display content. A first set of display content 510 may include a set of display data currently being displayed. A second set of display content 520 may include a set of display data that will be displayed. A content analyzer 530 compares the display data of the two sets of display content 510 and 520. If the sets of display content 510 and 520 are substantially different, content analyzer can set a flag of output registers 530 indicating the display content is changing. Alternatively, if the two sets of display content 510 and 520 are substantially the same, the content analyzer 530 may apply a value to a register of output registers 530 indicating the display content is not changing. The sets of display content 510 and 520 may include portions of the total display content, allowing content analyzer 530 to determine how much of the display content is actually changing. If only a few portions of the total display content change, the content analyzer may not consider the sets of display content 510 and 520 substantially different. In one embodiment, the sets of display content 510 and 520 are stored in memory, such as in video memory or a frame buffer.

In one embodiment, the power module monitors output registers 530 to determine display activity. If the display content appears to be changing, the power module may initiate a normal power mode to ensure the new display data is processed in time. Alternatively, if the display content is not substantially changing, the power module may initiate power conservation modes. In one embodiment, the power module reduces the number of bits used to represent display data. Using the reduced number of bits, the display data may be processed at slower speeds and less active communications lines are needed to provide the display data to a display device or screen. Furthermore, a frame rate used to output display data can also be reduced. Accordingly, by reducing an amount of data output through a display port, power consumption associated with display data processing and display can be reduced. In one embodiment, the display-monitoring module 500 is part of a set of hardware components used to process display content for output through a display device. While display content is discussed in reference to display-monitoring module 500, it should be appreciated that other forms of content may also be monitored without departing from the scope of the present invention. For example, audio content to be output may be monitored to determine a power mode to be initiated.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that the system described herein has the advantage of dynamically reducing power consumption in response to system activity.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
    identifying a rate of change of a number of pending instructions stored in an instruction buffer; and
    adjusting a system characteristic based on the rate of change of the number of pending instructions, wherein a power consumption of a system is modified based on the system characteristic.

2. The method as in claim 1, wherein adjusting the system characteristic includes altering the number of bits used to represent a multimedia data processed by the system.

3. The method as in claim 2, wherein the multimedia data includes video data.

4. The method as in claim 2, wherein the multimedia data includes audio data.

5. The method as in claim 1, wherein adjusting the system characteristic includes modifying a norminal power provided tothe system.

6. The method as in claim 5, wherein a clock speed is modified based on the modification of the nominal power.

7. The method as in claim 5, wherein a number of bits used to represent multimedia data is modified based on the modification of the nominal power.

8. The method as in claim 1, wherein the step of adjusting the system characteristic includes modifying a clock speed.

9. The method as in claim 1, wherein the adjusting the system characteristic includes modifying a maximum power provided to the system.

10. A method comprising:
    identifying an operating characteristic of an instruction buffer, the operating characteristic comprising at least one of a buffer fullness or a rate of change of a number of pending instructions stored in the instruction buffer; and
    adjusting a system characteristic based on the operating characteristic, wherein a power consumption of a system is modified based on the system characteristic and wherein adjusting the system characteristic includes modifying a clock speed.

11. The method as in claim 10, wherein a nominal power provided to the system is modified based on an amount of power needed for the clock speed used.

12. The method as in claim 10, wherein a number of bits used to represent a multimedia data processed by the system is reduced.

13. A system comprising:
    an instruction buffer to store pending instructions;
    a threshold register to store a statistic threshold;
    a buffer monitor to:
        track a buffer statistic;
        provide a buffer status of said buffer statistic to a power threshold, wherein said buffer status represents a comparison of said buffer statistic and said statistic threshold; and 14. The system as in claim 13, wherein said pending instructions include multimedia instructions.

15. The system as in claim 14, wherein said multimedia instructions include display instructions.

16. The system as in claim 13, wherein said buffer statistic includes a fullness of said instruction buffer.

17. The system as in claim 13, wherein said buffer statistic includes a number of pending instructions in said instruction buffer.

18. The system as in claim 13, wherein said buffer statistic includes a rate of change in a number of pending instructions in said instruction buffer.

19. The system as in claim 13, wherein said buffer statistic includes types of instructions in said instruction buffer.

20. The system as in claim 13, wherein the power conservation feature includes a modification of a clock speed.

21. The system as in claim 13, wherein the power conservation feature includes a modification of a maximum power provided to the system.

22. The system as in claim 13, wherein the power conservation feature includes a modification of a number of bits to represent multimedia data.

23. A computer readable medium tangibly embodying a program of instructions to manipulate a data processor to:
    identify a rate of change of a number of pending instructions stored in an instruction buffer; and
    adjust a system characteristic based on the rate of change of the number of pending instructions, wherein a power consumption of the system is modified based on the system characteristic.

24. The computer readable medium as in claim 23, wherein the system characteristic includes a number of bits used to represent a multimedia data.

25. The computer readable medium as in claim 23, wherein the system characteristic includes a clock speed used to process the instructions.

26. The computer readable medium as in claim 23, wherein the system characteristic includes a supported power.

* * * * *

UNITED STATES PATENT AND TRADEMARK OFFICE
CERTIFICATE OF CORRECTION

| | | |
|---|---|---|
| PATENT NO. | : 7,114,086 B2 | Page 1 of 1 |
| APPLICATION NO. | : 10/083875 | |
| DATED | : September 26, 2006 | |
| INVENTOR(S) | : Carl Mizuyabu et al. | |

It is certified that error appears in the above-identified patent and that said Letters Patent is hereby corrected as shown below:

Column No. 13, Line No. 25, change "tothe" to --to the--

Column No. 14, Line No. 10, at the end of the line, insert --a power module to initiate a power conservation feature based on said buffer status--

Signed and Sealed this

Fifth Day of June, 2007

JON W. DUDAS
*Director of the United States Patent and Trademark Office*